US010094333B2

(12) United States Patent
Papa et al.

(10) Patent No.: US 10,094,333 B2
(45) Date of Patent: Oct. 9, 2018

(54) VENTILATION SYSTEM USING THRUST REVERSER LINKAGES

(71) Applicant: United Technologies Corporation, Hartford, CT (US)

(72) Inventors: Federico Papa, Ellington, CT (US); Pilar Del Carmen Vivar, West Hartford, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 294 days.

(21) Appl. No.: 14/765,917

(22) PCT Filed: Mar. 11, 2014

(86) PCT No.: PCT/US2014/022940
§ 371 (c)(1),
(2) Date: Aug. 5, 2015

(87) PCT Pub. No.: WO2014/159311
PCT Pub. Date: Oct. 2, 2014

(65) Prior Publication Data
US 2015/0369171 A1 Dec. 24, 2015

Related U.S. Application Data

(60) Provisional application No. 61/781,482, filed on Mar. 14, 2013.

(51) Int. Cl.
F02C 7/18 (2006.01)
F02K 1/70 (2006.01)
(Continued)

(52) U.S. Cl.
CPC .............. F02K 1/70 (2013.01); F02C 7/18 (2013.01); F02K 1/76 (2013.01); F02C 6/08 (2013.01);
(Continued)

(58) Field of Classification Search
CPC ..... F02K 1/70; F02K 1/72; F02K 1/74; F02K 3/075
See application file for complete search history.

(56) References Cited

U.S. PATENT DOCUMENTS 3,875,742 A 4/1975 McMurtry et al.
4,373,328 A 2/1983 Jones
(Continued)

OTHER PUBLICATIONS

Extended European Search Report for EP Application No. 14774314.0 dated Nov. 8, 2016, 7 pages.
(Continued)

Primary Examiner — Gerald L Sung
Assistant Examiner — Rene Ford
(74) Attorney, Agent, or Firm — Kinney & Lange, P.A.

(57) ABSTRACT

A gas turbine engine includes a fan duct, an inner fixed structure, and a thrust reverser assembly. The inner fixed structure forms an inner diameter of the fan duct and encloses a core compartment. The thrust reverser assembly includes a linkage assembly mounted to the inner fixed structure within the fan duct. The linkage assembly is adapted to act as a ventilation system that allows for communication between the fan duct and the core compartment.

4 Claims, 3 Drawing Sheets

(51) Int. Cl.
    *F02K 1/76*            (2006.01)
    *F02K 1/72*            (2006.01)
    *F02C 9/18*            (2006.01)
    *F02C 6/08*            (2006.01)

(52) U.S. Cl.
    CPC .................. *F02C 9/18* (2013.01); *F02K 1/72* (2013.01); *F05D 2260/608* (2013.01); *Y02T 50/675* (2013.01)

(56) References Cited

U.S. PATENT DOCUMENTS

| | | | |
|---|---|---|---|
| 4,564,160 | A | 1/1986 | Vermilye |
| 5,575,147 | A | 11/1996 | Nikkanen |
| 5,899,059 | A * | 5/1999 | Gonidec .................. F02K 1/70 239/265.37 |
| 6,634,596 | B2 | 10/2003 | Albero et al. |
| 8,109,467 | B2 | 2/2012 | Murphy |
| 2005/0268612 | A1 | 12/2005 | Rolt |
| 2008/0080967 | A1 | 4/2008 | Urbassik et al. |
| 2009/0007567 | A1 | 1/2009 | Porte et al. |
| 2009/0025366 | A1 | 1/2009 | Martinou et al. |
| 2010/0132332 | A1 * | 6/2010 | Vauchel .................. F02K 1/72 60/226.2 |
| 2010/0150700 | A1 | 6/2010 | Strecker et al. |
| 2010/0270428 | A1 | 10/2010 | Murphy |
| 2013/0047580 | A1 * | 2/2013 | Beardsley .............. B64D 29/06 60/226.2 |

OTHER PUBLICATIONS

The International Search Report dated Jun. 17, 2014 for International Application No. PCT/US2014/022940.

* cited by examiner

VENTILATION SYSTEM USING THRUST REVERSER LINKAGES

CROSS-REFERENCE TO RELATED APPLICATION(S)

This application claims the benefit of U.S. Provisional Application No. 61/781,482 filed Mar. 14, 2013 for "VENTILATION SYSTEM USING THRUST REVERSER LINKAGES" by Federico Papa and Pilar Del Carmen Vivar, and claims the benefit of PCT application PCT/US2014/022940 filed Mar. 11, 2014 for "VENTILATION SYSTEM USING THRUST REVERSER LINKAGES" by Federico Papa and Pilar Del Carmen Vivar.

BACKGROUND

This disclosure relates to gas turbine engines, and in particular, to ventilation system for a gas turbine engine.

Modern aircraft turbofan engines include a fan nacelle surrounding a core nacelle. The core nacelle encloses a core compartment that houses the core as well as components such as pressurized conduits and ducts. The core drives a fan arranged in a bypass flow path formed between the core and fan nacelles. A large proportion of the total thrust of the engine is developed by the reaction to the air driven rearward through the bypass flow path by the fan.

Aircraft using turbofan engines tend to have high landing speeds, placing great stress on wheel braking systems and requiring very long runways. To reduce this braking requirement and permit use of shorter runways, means are now provided in such engines for reversing a major portion of engine thrust during the landing roll. To this end many different types of thrust reversers have been designed.

SUMMARY

A gas turbine engine includes a fan duct, an inner fixed structure, and a thrust reverser assembly. The inner fixed structure forms an inner diameter of the fan duct and encloses a core compartment. The thrust reverser assembly includes a linkage assembly mounted to the inner fixed structure within the fan duct. The linkage assembly is adapted to act as a ventilation system that allows for communication between the fan duct and the core compartment.

A method for ventilating a core compartment of a gas turbine engine includes enclosing the core compartment with an inner fixed structure, mounting a linkage assembly to an inner fixed structure to dispose the linkage assembly within a fan duct, and communicating airflow from the fan duct through the linkage assembly to the core compartment.

A linkage assembly for a thrust reverser assembly includes a bracket and a link member. The link member is pivotally mounted to the bracket and is movable between a stowed position and a deployed position. One or both of the bracket and link member include one or more conduits therein to allow for the passage of an airflow when the thrust reverser assembly is in a stowed position.

DETAILED DESCRIPTION

As turbofan engines become increasingly more complex and efficient, the higher their bypass ratios become. A higher bypass ratio in a turbofan engine leads to better fuel burn because the fan is more efficient at producing thrust than the core engine. The introduction of a fan drive gear system for turbofan engines has also led to smaller engine cores, which are housed within the core nacelle. The system and components described herein utilizes the pressure differential between a pressure of the fan duct and a pressure of a core compartment to ventilate components housed within the core compartment. In particular, the ventilation system disclosed utilizes components of a thrust reverser assembly to ventilate the core compartment. In one embodiment, the ventilation system utilizes one or more passages within a linkage assembly of the thrust reverser as conduits to pass air from the fan duct to the core cavity for cooling purposes.

Utilizing components of the thrust reverser assembly does not impact acoustic treatment of the core nacelle (also called the inner fixed structure). Additionally, ventilating the core compartment has minimal impact on engine thrust and can increase overall engine efficiency by reducing pressure losses in the fan duct.

Figure 1:
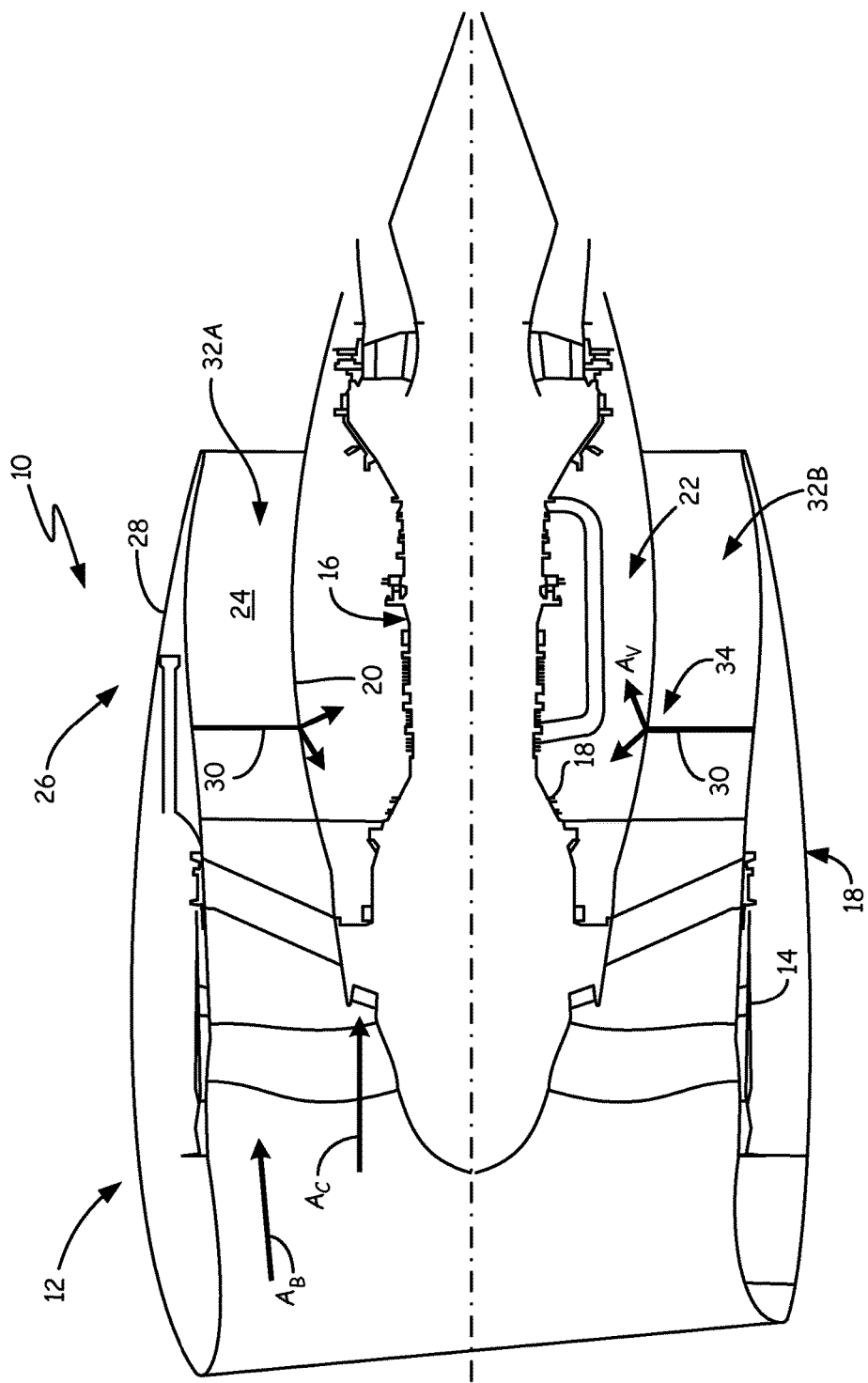
FIG. 1 is a cross section of a schematic gas turbine engine including a ventilation system for a core compartment.

FIG. 1 illustrates one embodiment of gas turbine engine 10. Gas turbine engine 10 includes nacelle 12, fan case 14, core 16, outer cowl 18, fan duct inner fixed structure 20, core compartment 22, and fan duct 24. Nacelle 12 includes thrust reverser 26 with translating sleeve 28 and linkage assemblies 30, and upper and lower bifurcations 32A and 32B.

The construction and operational characteristics of gas turbine engine 10 are known, and therefore, will not be described in great detail. In the embodiment shown in the FIGURES, gas turbine engine 10 is a high bypass ratio turbofan gas turbine engine but the invention is applicable to other types of gas turbine engines, for example, with lower bypass ratios. As used herein, terms such as "front", "forward", "aft", "rear", "rearward" should be understood as positional terms in reference to the direction of airflow $A_C$ and $A_B$ through gas turbine engine 10.

Nacelle 12 encloses fan case 14 and core 16. Fan case 14 is disposed adjacent to core 16. Core 16 is a static structure generally comprised of several sub-structures and is often referred to as the engine backbone. Outer cowl 18 surrounds fan case 14 and extends rearward thereof. Inner fixed structure 20 surrounds core 16 and provides for core compartment 22. Various components may be provided in core compartment 22, in addition to core 16 such as fluid conduits. Fan duct 24 is the flowpath formed between inner fixed structure 20 and outer cowl 18.

In the embodiment shown in FIG. 1, outer cowl 18 aft of fan exit guide vanes includes thrust reverser 26. Translating sleeve 28 is shown in a closed position in FIG. 1. Linkage assemblies 30 are shown in a stowed position coupled to components of thrust reverser 26. In the stowed position linkage assemblies 30 are disposed in fan duct 24 and extend between thrust reverser 26 and inner fixed structure 20.

Upper and lower bifurcations 32A and 32B are disposed in locations opposite one another relative to core 16 such as along engine 10 top dead center and bottom dead center. Upper and lower bifurcations 32A and 32B extend between outer cowl 18 and inner fixed structure 20 and accommodate wires, fluid conduits, engine mounting, or other components. Together, fan duct inner fixed structure 20, upper and lower bifurcations 32A, 32B, and outer cowl 18 (including thrust reverser 26) collectively form portions of fan duct 24.

During operation, for example at altitude, airflow is drawn into gas turbine engine 10 at the fan section. A portion of the airflow, comprising airflow $A_B$, bypasses core 16 and passes through nacelle 12 along fan duct 24 and produces forward fan thrust. A second portion of the airflow, comprising airflow $A_C$, enters core 16 and is pressurized in the compressor sections (low and high). Fuel is mixed with the pressurized air and combusted within a combustor. The combustion gases are discharged through the turbine sections (high and low), which extract energy therefrom for powering the compressor sections and the fan section.

The construction and operation of thrust reversers such as thrust reverser 26 are known in the art, and therefore, will not be discussed in great detail. Thrust reverser 26 reduces aircraft braking requirements and permits the use of shorter runways by reversing a major portion of engine thrust during the landing roll. Thrust reverser 26 slows down the aircraft by preventing gas turbine engine 10 from generating forward fan thrust and by generating reverse thrust to counteract primary forward thrust. Thrust reverser 26 is disposed in the downstream portion of outer cowl 18 and uses translating sleeve 28, linkage assemblies 30, and blocker doors (not shown in FIG. 1). Each of the aforementioned components has a stowed and a deployed position. In the stowed position of FIG. 1, blocker doors are disposed in a substantially parallel relationship to the longitudinal axis of the engine. Upon actuation, blocker doors are swung into the deployed position by linkage assemblies 30 to block fan duct 24, thereby preventing the fan flow from generating the forward fan thrust. Upon actuation, translating sleeve 28 slides axially downstream into the deployed position (not shown in FIG. 1) to expose a plurality of cascades (not shown in FIG. 1). Each cascade includes a plurality of turning vanes to guide the fan flow. Since blocker doors block the path of the fan flow, substantially the entire fan flow is diverted through the cascades. The turning vanes turn the fan flow to generate reverse thrust that counteracts the forward primary thrust. Further discussion of the construction and operation of components of thrust reverser 26, including linkage assemblies 30, translating sleeve 28, and blocker doors are discussed in U.S. Pat. No. 8,109,467, U.S. Pat. No. 5,575,147, U.S. Pat. No. 4,564,160, and U.S. Pat. No. 4,373,328, which are incorporated herein by reference.

Gas turbine engine 10 is illustrated as a high-bypass aircraft engine that utilizes a geared architecture such as an epicyclic gear train. In one example, engine bypass ratio is greater than six, with an example embodiment being greater than ten. In the example embodiment, engine bypass ratio is greater than about ten (10:1), and the fan diameter is significantly larger than that of the low pressure compressor. Gas turbine engine 10 has a low fan pressure ratio. As used herein, "low fan pressure ratio" is the pressure ratio across the fan blade alone, without a Fan Exit Guide Vane system. The low fan pressure ratio as disclosed herein according to one non-limiting embodiment is less than about 1.45.

Gas turbine engine 10 includes ventilation system 34 that utilizes the pressure differential between the pressure of fan duct 24 and a pressure of core compartment 22 to ventilate components housed within core compartment 22, including components of core 16. In particular, ventilation system 34 utilizes components of thrust reverser 26 to ventilate the core compartment.

In one embodiment, a plurality of holes is disposed along a forward facing surface of linkage assemblies 30. These holes receive bleed air $A_V$, which comprises a portion of airflow $A_B$ passing through fan duct 24. Passages communicate the bleed air $A_V$ through linkage assemblies 30 and through inner fixed structure 20 into core compartment 22. In another embodiment, a mounting bracket for the linkage assemblies 30 can be provided with a scoop that receives bleed air $A_V$ from fan duct 24. This bleed air $A_V$ passes through scoop and through inner fixed structure 20 into core compartment 22. Utilizing linkage assemblies 30 with ventilation system 34 does not impact acoustic treatment of inner fixed structure 20. Additionally, ventilating core compartment 22 with linkage assemblies 30 minimally impacts engine thrust and can increase overall engine efficiency by reducing pressure losses in fan duct 24.

Figure 2:
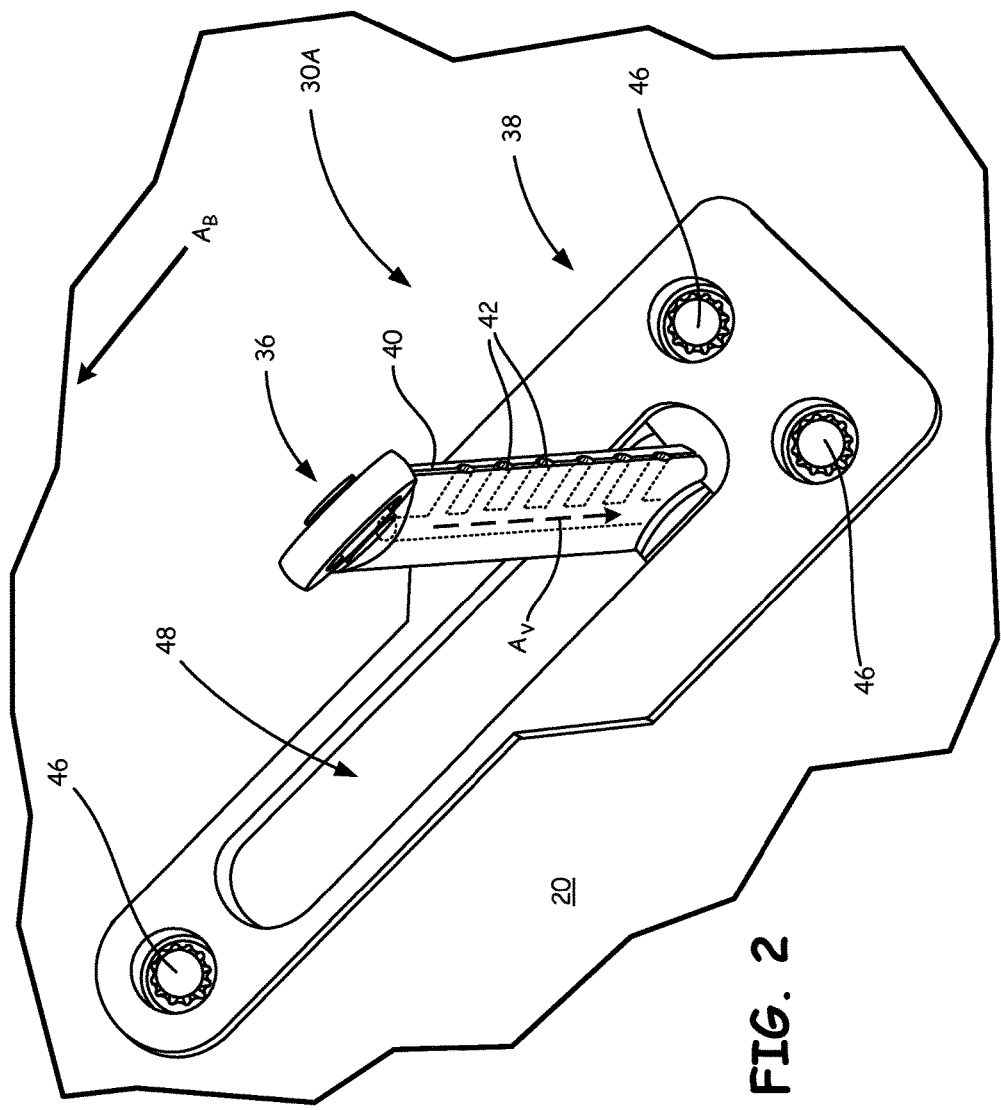
FIG. 2 is a perspective view of one embodiment of a thrust reverser linkage assembly which includes a portion of the ventilation system of FIG. 1.

FIG. 2 shows one embodiment of linkage assembly 30A mounted to inner fixed structure 20. Linkage assembly 30A includes link member 36 and bracket 38. Link member 36 includes upstream surface 40, holes 42, and internal passage 44. Bracket 38 includes fasteners 46 and recess 48.

In FIG. 2, one linkage assembly 30A is illustrated in a stowed position where thrust reverser 26 (FIG. 1) would not be operable. Linkage assembly 30A comprises one of a plurality of linkage assemblies 30 that are circumferentially arrayed within fan duct 24 (FIG. 1). Link member 36 is pivotally connected to bracket 38. Bracket 38 is mounted to inner fixed structure 20. In the stowed position illustrated in FIG. 2, link member 36 extends generally radially away from bracket 38 and inner fixed structure 20 through fan duct 34 (FIG. 1).

Upstream surface 40 comprises the forward portion of link member 36 that is exposed directly to airflow $A_B$ passing through fan duct 24. Upstream surface 40 forms holes 42 that are arranged along the radial length of link member 36. Holes 42 communicate with internal passage 44, which acts as a conduit for directing bleed air $A_V$ received by holes 42 into core compartment 22 (FIG. 1) through inner fixed structure 20. In FIG. 2, the size, shape and number of holes 42 and internal passage 44 illustrated are exemplary. The size, shape, and number of holes 42 and internal passage 44 will vary from application and are dependent upon operating conditions such as engine size, operating speed and altitude. The size, shape, and number can be determined utilizing computational fluid dynamics software.

In the embodiment of FIG. 2, bracket 38 has a streamlined shape so as minimally interfere with airflow $A_B$ passing through fan duct 24. Bracket 38 is connected to inner fixed structure 20 by fasteners 46. Bracket 38 is shaped to form recess 48, which is adapted to receive link member 36 when thrust reverser 26 (FIG. 1) is deployed. In particular, as thrust reverser 26 is deployed link member 36 is pivoted to be received in recess 48.

As discussed previously, bleed air $A_V$ that passes through holes 42 and internal passage 44, and an aperture (not shown) in inner fixed structure 20 is used for cooling components within core compartment 22 (FIG. 1). Utilizing linkage assembly 30A as part of ventilation system 34 (FIG. 1) does not impact acoustic treatment of inner fixed structure 20. Additionally, ventilating core compartment 22 has minimal impact on engine thrust and can increase overall engine efficiency by reducing pressure losses in fan duct 24.

Figure 3:
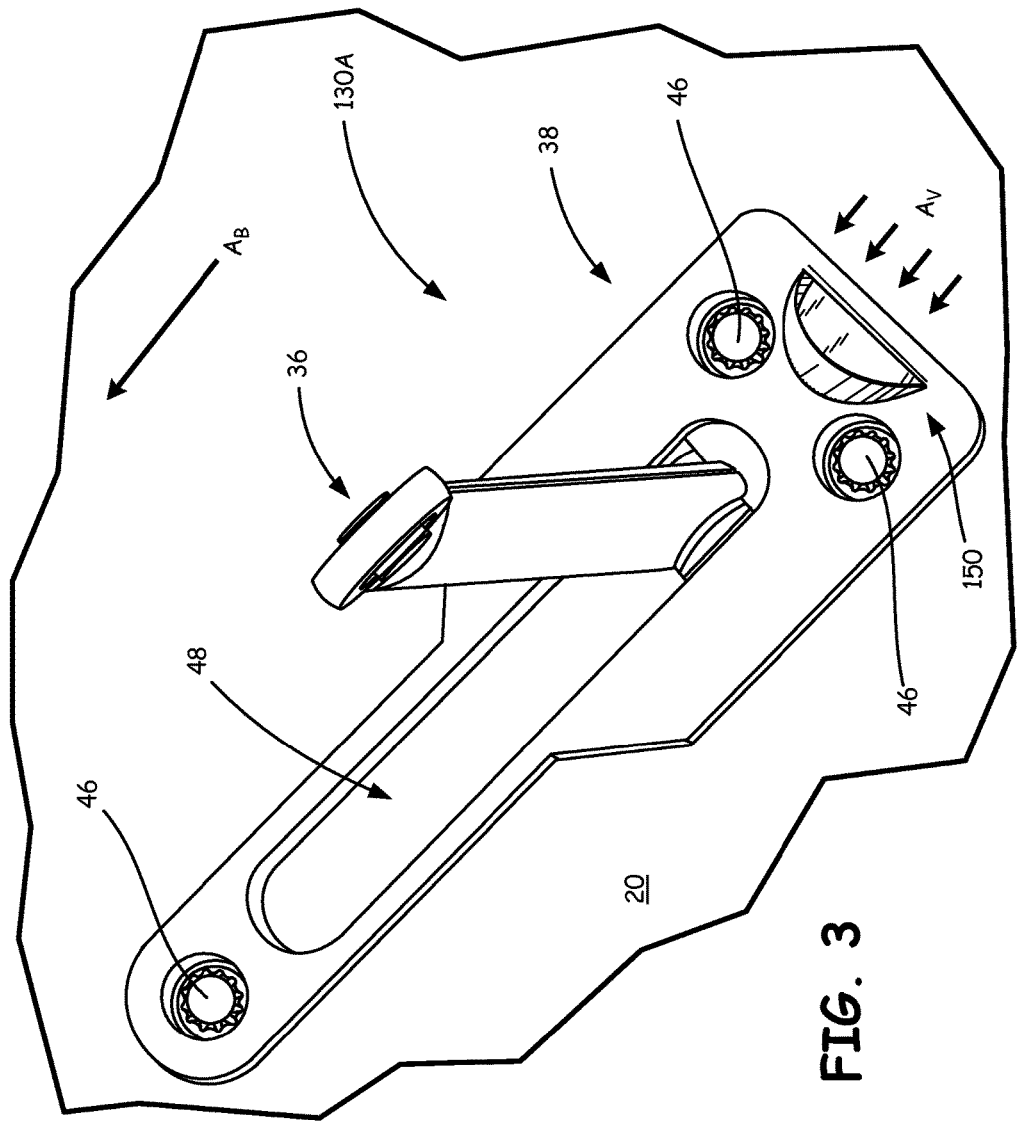
FIG. 3 is a perspective view of a second embodiment of the thrust reverser linkage assembly which includes a portion of the ventilation system of FIG. 1.

FIG. 3 shows a second embodiment of linkage assembly 130A mounted to inner fixed structure 20. Similar to the embodiment of FIG. 2, linkage assembly 130A includes link member 36, bracket 38, upstream surface 40, fasteners 46 and recess 48. However, linkage assembly 130A additionally includes scoop 150 and does not include holes 42 and internal passage 44 (FIG. 2).

As with the embodiment of FIG. 2, the embodiment of linkage assembly 130A in FIG. 3 is illustrated in a stowed position, where thrust reverser 26 (FIG. 1) would not be operable. Linkage assembly 130A is one of a plurality of linkage assemblies 30 that are circumferentially arrayed within fan duct 24 (FIG. 1). Linkage assembly 130A is constructed and operates in a manner similar to linkage assembly 30A of FIG. 2.

Scoop 150 is defined by bracket 38 and is disposed upstream (forward) of link member 36. Scoop 150 is positioned to open into flow path of airflow $A_B$ passing through fan duct 24. Thus, a portion of airflow $A_B$, comprising bleed air $A_V$, is captured by scoop 150 and is directed through bracket 38 and through inner fixed structure 20 into core compartment 22 (FIG. 1) for cooling purposes.

Discussion of Possible Embodiments

The following are non-exclusive descriptions of possible embodiments of the present invention.

A gas turbine engine includes a fan duct, an inner fixed structure, and a thrust reverser assembly. The inner fixed structure forms an inner diameter of the fan duct and encloses a core compartment. The thrust reverser assembly includes a linkage assembly mounted to the inner fixed structure within the fan duct. The linkage assembly is adapted to act as a ventilation system that allows for communication between the fan duct and the core compartment.

The gas turbine engine of the preceding paragraph can optionally include, additionally and/or alternatively, any one or more of the following features, configurations and/or additional components:

the linkage assembly includes a link member that extends within the fan duct when the thrust reverser assembly is stowed, and a forward surface of the link member forms one or more apertures.

the one or more apertures communicate with a passage internal to the link member, and the passage communicates with the core compartment;

the linkage assembly includes a link member that is mounted to a bracket that is connected to the inner fixed structure; and the bracket forms a scoop upstream of the link member, and the scoop communicates with the core compartment.

A method for ventilating a core compartment of a gas turbine engine includes enclosing the core compartment with an inner fixed structure, mounting a linkage assembly to an inner fixed structure to dispose the linkage assembly within a fan duct, and communicating airflow from the fan duct through the linkage assembly to the core compartment.

The method of the preceding paragraph can optionally include, additionally and/or alternatively, any one or more of the following features, configurations and/or additional components:

the step of communicating airflow from the fan duct through the linkage assembly comprises providing a link member with a forward surface of the link member forming one or more apertures that receive the airflow;

the step of communicating airflow from the fan duct through the linkage assembly comprises communicating the airflow through the one or more apertures to a passage internal to the link member;

the step of communicating airflow from the fan duct through the linkage assembly comprises communicating the airflow through the passage to the core compartment;

the step of mounting the linkage assembly to the inner fixed structure comprises mounting a link member to a bracket; and the step of communicating airflow from the fan duct through the linkage assembly comprises communicating the airflow through a scoop disposed upstream of the link member.

A linkage assembly for a thrust reverser assembly includes a bracket and a link member. The link member is pivotally mounted to the bracket and is movable between a stowed position and a deployed position. One or both of the bracket and link member include one or more conduits therein to allow for the passage of an airflow when the thrust reverser assembly is in a stowed position.

The linkage assembly of the preceding paragraph can optionally include, additionally and/or alternatively, any one or more of the following features, configurations and/or additional components:

a fan duct, and an inner fixed structure forming an inner diameter of the fan duct and enclosing a core compartment, the bracket is mounted to the inner fixed structure and the link member extends within the fan duct;

a forward surface of the link member forms one or more apertures;

the one or more apertures communicate with a passage internal to the link member, and the passage communicates with the core compartment; and the bracket forms a scoop upstream of the link member, and the scoop communicates with the core compartment.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A gas turbine engine comprising:
   a fan duct;
   an inner fixed structure forming an inner diameter of the fan duct and enclosing a core compartment; and
   a thrust reverser assembly including a linkage assembly mounted to the inner fixed structure within the fan duct, wherein the linkage assembly is adapted to act as a ventilation system that allows for communication between the fan duct and the core compartment, and wherein the linkage assembly includes a link member that extends within the fan duct when the thrust reverser assembly is stowed, and the link member pivots into a recess when the thrust reverser is deployed.

2. The gas turbine engine of claim 1, wherein a forward surface of the link member forms one or more apertures.

3. The gas turbine engine of claim 2, wherein the one or more apertures communicate with a passage internal to the link member, and wherein the passage communicates with the core compartment.

4. The gas turbine engine of claim 1, wherein the linkage assembly includes a link member that is mounted to a bracket, which is connected to the inner fixed structure.

\* \* \* \* \*